United States Patent
Mizutani

(10) Patent No.: US 7,835,833 B2
(45) Date of Patent: Nov. 16, 2010

(54) ABNORMALITY DETECTION DEVICE OF SHIFT POSITION SENSOR

(75) Inventor: Haruchika Mizutani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 768 days.

(21) Appl. No.: 11/815,517

(22) PCT Filed: Mar. 16, 2006

(86) PCT No.: PCT/JP2006/305769

§ 371 (c)(1),
(2), (4) Date: Aug. 3, 2007

(87) PCT Pub. No.: WO2006/098509

PCT Pub. Date: Sep. 21, 2006

(65) Prior Publication Data

US 2009/0204282 A1  Aug. 13, 2009

(30) Foreign Application Priority Data

Mar. 17, 2005  (JP)  ............... 2005-077482

(51) Int. Cl.
*G06F 19/00* (2006.01)

(52) U.S. Cl. .............. 701/29; 701/31; 701/34

(58) Field of Classification Search ........... 701/29, 701/31, 34, 36, 51; 477/107, 109, 906
See application file for complete search history.

(56) References Cited

U.S. PATENT DOCUMENTS

| 6,778,076 B2 * | 8/2004 | Shidara et al. | 340/451 |
| 7,107,869 B2 * | 9/2006 | Amamiya et al. | 74/335 |

FOREIGN PATENT DOCUMENTS

| JP | 3 255262 | 11/1991 |
| JP | 5 90029 | 12/1993 |
| JP | 11 86680 | 3/1999 |
| JP | 2000 179660 | 6/2000 |
| JP | 2002 276801 | 9/2002 |

* cited by examiner

Primary Examiner—Richard M. Camby
(74) Attorney, Agent, or Firm—Oblon, Spivak, McClelland, Maier & Neustadt, L.L.P.

(57) ABSTRACT

To detect a failure of a position contact outputting a contact signal, a change of a shift pattern defined by a combination of contact signals is monitored. Upon detection of the shift patterns belonging to a plurality of regions bridging a shift position corresponding to a selected position during an off period of the contact signal, a failure of the position contact is detected. As such, in a shift position sensor selecting a shift position by a combination of the contact signals from a plurality of position contacts, abnormality of the position contact can be detected reliably.

4 Claims, 7 Drawing Sheets

FIG.3

| SELECTED POSITION | | P | | R | N | | D | B |
|---|---|---|---|---|---|---|---|---|
| CONTACT SIGNALS | SP | ON | | | | | | OFF |
| | SR | OFF | | | | | | OFF |
| | SN | OFF | | | | | | OFF |
| | SD | OFF | | | | | | OFF |
| | SB | OFF | | | | | | ON |
| | SRV | OFF | | | | | | OFF |
| | SFD | OFF | | | | | | ON |
| | SMJ | ON | | | | | | ON |

|  | SHIFT PATTERN |
|---|---|
| ADJACENT REGION I | SP2 |
| ADJACENT REGION II | SP5, SP7 |
| ADJACENT REGION III | SP9, SP11 |
| ADJACENT REGION IV | SP14 |

ABNORMALITY DETECTION DEVICE OF SHIFT POSITION SENSOR

TECHNICAL FIELD

The present invention relates to an abnormality detection device of a shift position sensor, and more particularly to an abnormality detection device of a shift position sensor that detects selection of a shift position by a driver based on a combination of contact signals from a plurality of position contacts.

BACKGROUND ART

In a vehicle mounted with an automatic transmission, an operation of the automatic transmission is controlled in accordance with the shift position selected by manipulation of the driver to a shift position detection device. Specifically, the automatic transmission restricts the range of gear in accordance with the shift position, and changes the gear according to the vehicle speed and the throttle opening degree.

Generally, one shift position is selected by the driver's manipulation of a shift lever, from among a plurality of shift positions including: a parking position (hereinafter, referred to as the "P position") selected at the time of parking or stopping, a reverse position (hereinafter, referred to as the "R position") selected at the time of backward running of the vehicle, a neutral position (hereinafter, referred to as the "N position"), and a drive position (hereinafter, referred to as the "D position") selected at the time of forward running of the vehicle.

For such selection from among a plurality of shift positions, a shift position sensor is disclosed wherein a plurality of position contacts are arranged for detecting the position of the arm that moves along with manipulation of the shift lever (e.g., Japanese Patent Laying-Open No. 11-86680). With this shift position sensor, the shift position is detected based on a contact signal indicating presence/absence of contact of each position contact with the arm.

In the shift position sensor as described above, it is necessary to conduct abnormality detection when there is a failure of a position contact, since detection of the shift position will not be performed correctly on such an occasion. For example, validity of the combination of the contact signals from a plurality of position contacts provided at the shift position sensor may be checked, in which case abnormality can be detected when the combination of the contact signals does not correspond to any of the combinations that can essentially exist.

With such a configuration of abnormality detection, however, abnormality of the shift position sensor cannot be detected as long as the combination of the contact signals when there is a failure in the position contact is among those that can essentially exist, which may result in a delay in detection of abnormality. Further, the current combination of the contact signals needs to be compared with all the possible combinations one by one, leading to an increase in load of abnormality determination.

DISCLOSURE OF THE INVENTION

An object of the present invention is to perform abnormality detection of position contacts reliably and efficiently in a shift position sensor that detects selection of a shift position by a driver based on a combination of the contact signals from a plurality of position contacts.

An abnormality detection device of a shift position sensor according to the present invention is an abnormality detection device of a shift position sensor having at least three shift positions, a sliding contact movable in accordance with a shift position selecting manipulation of a driver, and a plurality of position contacts outputting prescribed contact signals when coming into contact with the sliding contact. In the shift position sensor, the sliding contact has a movable range, and the movable range is provided with a plurality of shift position locations corresponding respectively to the shift positions and a transition region positioned between each adjacent two of the shift position locations. The plurality of position contacts include a plurality of first position contacts each provided to include corresponding one of the shift position locations and a part of the transition region on each side thereof, and a second position contact provided corresponding to every one of the shift position locations. At least some of the plurality of first position contacts are positioned such that arrangement locations of adjacent two of the first position contacts overlap each other by a predetermined range. The shift position sensor is configured to detect that the shift position is selected, when the contact signal is output from the second position contact, based on a combination of the contact signals output from the plurality of first position contacts. The abnormality detection device includes: an adjacent region determination unit and an abnormality detection unit. The adjacent region determination unit determines whether the combination of the contact signals from every one of the first and second position contacts belongs to any of a plurality of predetermined adjacent regions (regions I-IV) set corresponding to respective ones of the plurality of shift position locations among a plurality of regions (shift patterns SP1-SP17) defined corresponding to the combinations of the contact signals. The abnormality detection unit detects a failure of the second position contact when the contact signals have changed to experience two or more different ones of the predetermined adjacent regions by passing over the shift position location during a period in which the contact signal from the second position contact is maintained in a non-output state.

In the shift position sensor that is a target of monitoring by the abnormality detection device of a shift position sensor described above, at the time when the contact signal from the second position contact is normal, the phenomenon that the combination of the contact signals from every one of the position contacts changes to pass through a plurality of predetermined adjacent regions over a shift position location during the time in which the relevant contact signal is in a non-output state would not occur. Therefore, when detecting the occurrence of the above-described phenomenon during the time in which the contact signal from the second position contact is maintained in the non-output state, the abnormality detection device can detect abnormality of the second position contact, particularly the off failure (typically, disconnection failure) of which detection would be difficult with only simple validity check of the combination of the contact signals.

Preferably, the abnormality detection device of a shift position sensor according to the present invention is configured such that the failure of the second position contact is confirmed when the failure of the second position contact is detected a plurality of times repeatedly by the abnormality detection unit.

According to the abnormality detection device of a shift position sensor described above, erroneous detection of the failure of the second position contact can be prevented.

An abnormality detection device of a shift position sensor according to another configuration of the present invention is an abnormality detection device of a shift position sensor having at least three shift positions, a sliding contact movable in accordance with a shift position selecting manipulation of a driver, and a plurality of position contacts outputting prescribed contact signals when coming into contact with the sliding contact. In the shift position sensor, the sliding contact has a movable range, and the movable range is provided with a plurality of shift position locations corresponding respectively to the shift positions and a transition region positioned between each adjacent two of the shift position locations. The plurality of position contacts include a plurality of first position contacts each provided to include corresponding one of the shift position locations and a part of the transition region on each side thereof, and a second position contact provided corresponding to every one of the shift position locations. At least some of the plurality of first position contacts are positioned such that arrangement locations of adjacent two of the first position contacts overlap each other by a predetermined range. The shift position sensor is configured to detect that the shift position is selected, when the contact signal is output from the second position contact, based on a combination of the contact signals output from the plurality of first position contacts. The abnormality detection device includes: a transition detection unit, a region determination unit, and a first abnormality detection unit. The transition detection unit detects a first transition from an output state to a non-output state and a second transition from the non-output state to the output state of the contact signal from the second position contact. The region determination unit determines, upon detection of the first or second transition by the transition detection unit, whether the combination of the contact signals from every one of the first and second position contacts belongs to a predetermined region adjacent to a point of the transition (edge) of the contact signal from the second position contact among a plurality of regions (shift patterns SP1-SP17) defined corresponding to the combinations of the contact signals. The first abnormality detection unit detects a failure of the first position contact when the region determination unit determines that the combination of the contact signals does not belong to any of the predetermined regions.

According to the abnormality detection device of a shift position sensor described above, determination is made, using transition of the contact signal from the second position contact as a trigger, as to whether the combination of the contact signals from the position contacts belongs to a predetermined region adjacent to the edge of the contact signal having undergone transition. This enables detection of a failure of the first position contact by confirming validity of the combination of the contact signals. At this time, the comparison processing between the current combination of the contact signals and the normal combination of the contact signals needs to be carried out only for the shift position locations and some regions corresponding to their adjacent regions among the plurality of regions (shift patterns). Accordingly, the operation load as well as the data storage amount necessary for the abnormality detection can be reduced. As a result, the abnormality detection processing can be carried out with efficiency.

Preferably, the abnormality detection device of a shift position sensor according to the other configuration of the present invention further includes a second abnormality detection unit. The plurality of regions defined corresponding to the combinations of the contact signals include a plurality of predetermined adjacent regions set corresponding to respective ones of the plurality of shift position locations. The second abnormality detection unit detects a failure of the second position contact when the contact signals have changed to experience two or more different ones of the predetermined adjacent regions by passing over the shift position location during a period in which neither the first transition nor the second transition is detected by the transition detection unit.

According to the abnormality detection device of a shift position sensor described above, when the contact signal from the second position contact is normal, the phenomenon that the combination of the contact signals from the position contacts changes to pass through a plurality of predetermined adjacent regions over the shift position location during the time in which the relevant contact signal is in a non-output state would not occur in the shift position sensor. As such, abnormality of the second position contact, particularly the off failure (typically, disconnection failure) that would be difficult to detect only with simple validity check of the combination of the contact signals, can be detected when the occurrence of the above-described phenomenon is detected during the time in which the contact signal from the second position contact is maintained in a non-output state. Accordingly, the abnormality detection is possible for both the first and second position contacts.

As described above, according to the abnormality detection device of a shift position sensor of the present invention, abnormality detection of position contacts can be carried out reliably and efficiently in a shift position sensor that detects selection of a shift position by a driver based on the combination of the contact signals output from a plurality of position contacts.

BRIEF DESCRIPTION OF THE DRAWINGS

FIG. 3 illustrates correspondence between the combinations of contact signals from the position contacts shown in FIG. 1 and the shift positions.

FIG. 5 shows definitions of the regions shown in the flowchart in FIG. 4.

BEST MODES FOR CARRYING OUT THE INVENTION

Figure 1:
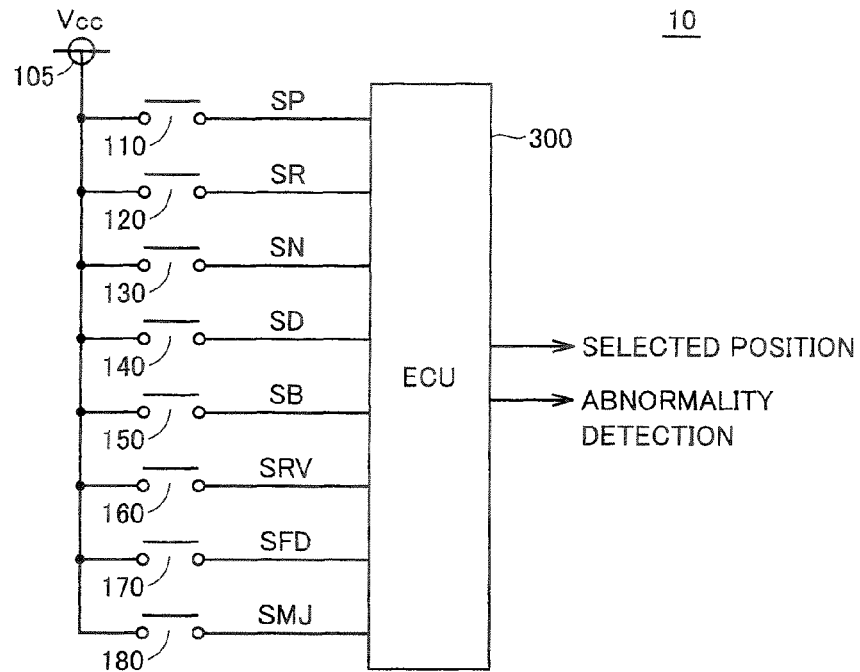
FIG. 1 is a schematic block diagram showing a configuration of an abnormality detection device of a shift position sensor according to an embodiment of the present invention.

Hereinafter, embodiments of the present invention will be described in detail with reference to the drawings. In the following, the same or corresponding portions have the same reference characters allotted, and detailed description thereof will not be repeated in principle.

FIG. 1 is a schematic block diagram showing a configuration of an abnormality detection device of a shift position sensor according to an embodiment of the present invention.

Referring to FIG. 1, the abnormality detection device 10 of a shift position sensor according to an embodiment of the present invention includes a plurality of position contacts 110-180, and an ECU (Electronic Control Unit) 300.

ECU 300 is composed of a digital computer, which performs operations in accordance with a prescribed program stored in an internal memory (not shown) to carry out selection of a shift position corresponding to manipulation of a lever by a driver as well as abnormality detection of a plurality of position contacts 110-180, based on the combination of contact signals SP, SR, SN, SD, SB, SRV, SFD, SMJ from position contacts 110-180.

Figure 2:
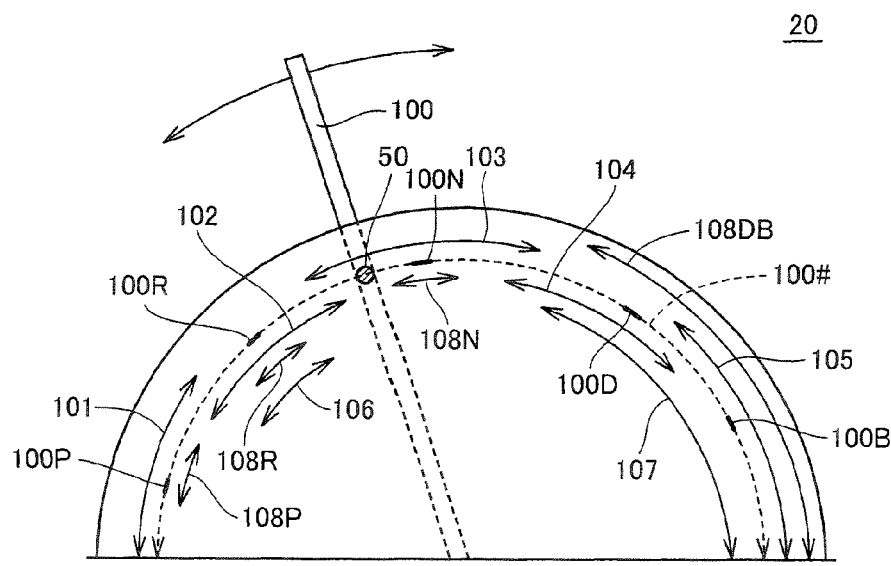
FIG. 2 illustrates arrangement of the position contacts shown in FIG. 1.

FIG. 2 illustrates arrangement of the position contacts shown in FIG. 1.

Referring to FIG. 2, the shift position sensor 20 is provided with a rotor 100 configured to be movable in a circumferential direction in response to manipulation of a shift lever (not shown) that is manipulated by a driver. Rotor 100 includes a sliding contact 50 with the position contacts. The plurality of position contacts 110-180 are arranged sequentially over a movable range 100# of sliding contact 50 in association with the driver's manipulation of the shift lever.

Position contact 110 is provided corresponding to a region 101. When sliding contact 50 is in region 101, position contact 110 comes into contact with sliding contact 50 to turn ON. When sliding contact 50 is out of region 101, position contact 110 is not in contact with sliding contact 50, so that it is OFF.

Similarly, position contact 120 is provided corresponding to a region 102, and when sliding contact 50 is in region 102, it comes into contact with sliding contact 50 to turn ON. When sliding contact 50 is out of region 102, position contact 120 is not in contact with sliding contact 50, and thus it is OFF. Position contacts 130-150 are similarly provided in regions 103-105 and each turn ON when in contact with sliding contact 50 while each turn OFF when not in contact with sliding contact 50.

Position contact 180 is provided corresponding to regions 108P, 108R, 108N, and 108DB, and when sliding contact 50 is in any of regions 108P, 108R, 108N, and 108DB, it turns ON as it comes into contact with sliding contact 50. Meanwhile, if sliding contact 50 is not in any of regions 108P, 108R, 108N, and 108DB, position contact 180 is OFF as it is not in contact with sliding contact 50.

Regions 108P, 108R, 108N, and 108DB are provided corresponding to shift position selecting locations of the shift lever not shown. Specifically, region 108P is defined to cover a sliding contact location 100P corresponding to the P position selecting location by the shift lever. Region 108R is defined to cover a sliding contact location 100R corresponding to the R position selecting location by the shift lever. Region 108N is defined to cover a sliding contact location 100N corresponding to the N position selecting location by the shift lever.

Similarly, region 108DB is defined to cover both a sliding contact location 100D corresponding to the D position selecting location by the shift lever and a sliding contact location 100B corresponding to the selecting location of the brake position (hereinafter, referred to as the "B position").

It is noted that the B position is a shift position provided in a hybrid vehicle, which is selected when it is desired to increase the regenerative braking force by a motor at the time of running down slope and the like. For the D position and the B position selected at the time of forward running of the vehicle, wide region 108DB is commonly provided.

Herein, on the movable range 100# of sliding contact 50, regions 108P, 108R, 108N, and 108DB each correspond to the "shift position location" where sliding contact 50 is located at the time of selection of the shift position, and the region between the neighboring shift position locations corresponds to the "transition region".

As shown in FIG. 2, regions 101-103 are arranged to include regions 108P, 108R and 108N, respectively, and to be wider than respective regions 108P, 108R and 108N. Further, the region covered by regions 104 and 105 includes region 108DB, and they are arranged such that the adjacent portions overlap each other.

For detection of the shift positions corresponding to the forward running and backward running of the vehicle, position contacts 160 and 170 are further provided in a multiple manner. Position contact 160 comes into contact with sliding contact 50 when sliding contact 50 is in a region 106 provided to cover region 108R. When sliding contact 50 is out of region 106, position contact 160 is not in contact with sliding contact 50.

Similarly, position contact 170 comes into contact with sliding contact 50 when sliding contact 50 is in a region 107 provided to cover region 108DB. When sliding contact 50 is out of region 107, position contact 170 is not in contact with sliding contact 50.

Referring again to FIG. 1, each of position contacts 110-180 connects a power source 105 with ECU 300 at the time of ON when it is in contact with sliding contact 50, and disconnects power source 105 from ECU 300 at the time of OFF when it is not in contact with sliding contact 50. As a result, each of contact signals SP, SR, SN, SD, SB, SRV, SFD and SMJ input to ECU 300 is turned "ON" when the corresponding position contact is ON, while it is turned "OFF" when the corresponding position contact is OFF. That is, for each of position contacts 110-180, ECU 300 recognizes that "the contact signal is in an output state" when the corresponding contact signal is "ON", while it recognizes that "the contact signal is in a non-output state" when the corresponding contact signal is "OFF".

Herein, position contacts 110-170 correspond to the "first position contacts" of the present invention, and position contact 180 corresponds to the "second position contact" of the present invention.

FIG. 3 shows the correspondence between the combinations of the contact signals from the position contacts shown in FIG. 1 and the shift positions.

Referring to FIG. 3, when each of position contacts 110-180 is normal, shift patterns SP1-SP17 defined corresponding to the combinations of the contact signals are obtained sequentially, as sliding contact 50 moves from a start point (on the P position side: the leftmost side in FIG. 2) to an end point (on the B position side: the rightmost side in FIG. 2) of movable range 100#, in accordance with the arrangement of position contacts 110-180 shown in FIG. 2.

When sliding contact 50 is in a shift position location and contact signal SMJ from position contact 180 is "ON" (i.e., at the time of any of shift patterns SP1, SP6, SP10, SP15-SP17), ECU 300 detects a selected position that has been selected from among the plurality of shift positions by the driver's manipulation, based on the combination of the contact signals from the other position contacts 110-170.

Specifically, at the time of shift pattern SP1 where contact signal SP is "ON" in addition to contact signal SMJ and the other contact signals are "OFF", the P position is detected as the selected position. At the time of shift pattern SP6 where contact signals SR and SRV are "ON" besides contact signal SMJ and the other contact signals are "OFF", the R position is detected as the selected position. Further, at the time of shift pattern SP10 where contact signal SN is "ON" besides contact signal SMJ and the other contact signals are "OFF", the P position is detected as the selected position.

Similarly, at the time of shift pattern SP15 where contact signals SD and SFD are "ON" besides contact signal SMJ and the other contact signals are "OFF", the D position is detected as the selected position. Further, at the time of each of shift patterns SP16 and SP17 where contact signals SB and SFD are "ON" besides contact signal SMJ, the B position is detected as the selected position.

It is noted that shift patterns SP1-SP17 shown in FIG. 3 correspond to "a plurality of regions" defined corresponding to the combinations of the contact signals from position contacts 110-180. Among them, each shift pattern located between shift patterns SP1, SP6, SP10, SP15, SP17 corresponding to the shift position locations corresponds to the "transition region".

As such, selection of the shift position is carried out at the time when contact signal SMJ from position contact 180 is "ON". Thus, the off failure of position contact 180, with which contact signal SMJ is fixed to "OFF" due to disconnection or other factors, needs to be detected reliably.

With a conventional abnormality detection configuration of a shift position, abnormality of each of position contacts 110-180 is detected when the combination of contact signals SP, SR, SN, SD, SB, SRV, SFD and SMJ does not correspond to any of shift patterns SP1-SP17 in FIG. 3. With such an abnormality detection configuration based on the validity check of the combination of the contact signals, however, the following problems arise.

As the first problem, it is difficult to detect the off failure of position contact 180 described above. For example, assume that sliding contact 50 is in the region corresponding to shift pattern SP1 that is the shift position location. In this case, when contact signal SMJ that is supposed to be "ON" in shift pattern SP1 is turned "OFF", the combination of the contact signals becomes identical to that in the case of shift pattern SP2. The conventional abnormality detection configuration cannot detect abnormality in this case.

Similarly, in other shift patterns SP6, SP10 and SP15 corresponding to the shift position locations, when contact signal SMJ that is supposed to be "ON" is "OFF", the combinations of the contact signals become identical to those of shift patterns SP5, 7, SP9, 11, and SP14, respectively. Thus, even if sliding contact 50 is in the relevant shift position location, the off failure of position contact 180 cannot be detected. Meanwhile, the combination of the contact signals when contact signal SMJ is turned "OFF" in shift pattern SP1 in shift pattern SP17 is different from that of the neighboring shift pattern SP16. Therefore, the off failure of position contact 180 can be detected when sliding contact 50 is in the region corresponding to shift pattern SP17. In other words, the abnormality can be detected only after the driver selects the B position, meaning that the detecting capability of the off failure of position contact 180 is low.

As the second problem, since it is necessary to detect the combination of the contact signals indicating the abnormal state, in order to carry out abnormality detection in response to the case where the driver manipulates the shift lever quickly, the processing of comparing the combination of the contact signals at that time point with the normal combinations needs to be carried out in a relatively short period.

Further, as the third problem, in the comparing processing described above, the combination of the contact signals at that time point needs to be compared with each of the normal combinations, i.e., each of shift patterns SP1-SP17. The second and third problems increase the load of the abnormality detection processing of position contacts 110-180 by ECU 300.

In the abnormality detection device of a shift position sensor according to the embodiment of the present invention, the abnormality of position contacts 110-180, particularly the off failure of position contact 180, is detected by shift position sensor abnormality detection control as described in the following. The routine of this shift position sensor abnormality detection control is carried out by ECU 300, at prescribed intervals, in accordance with a prestored program.

Figure 4:
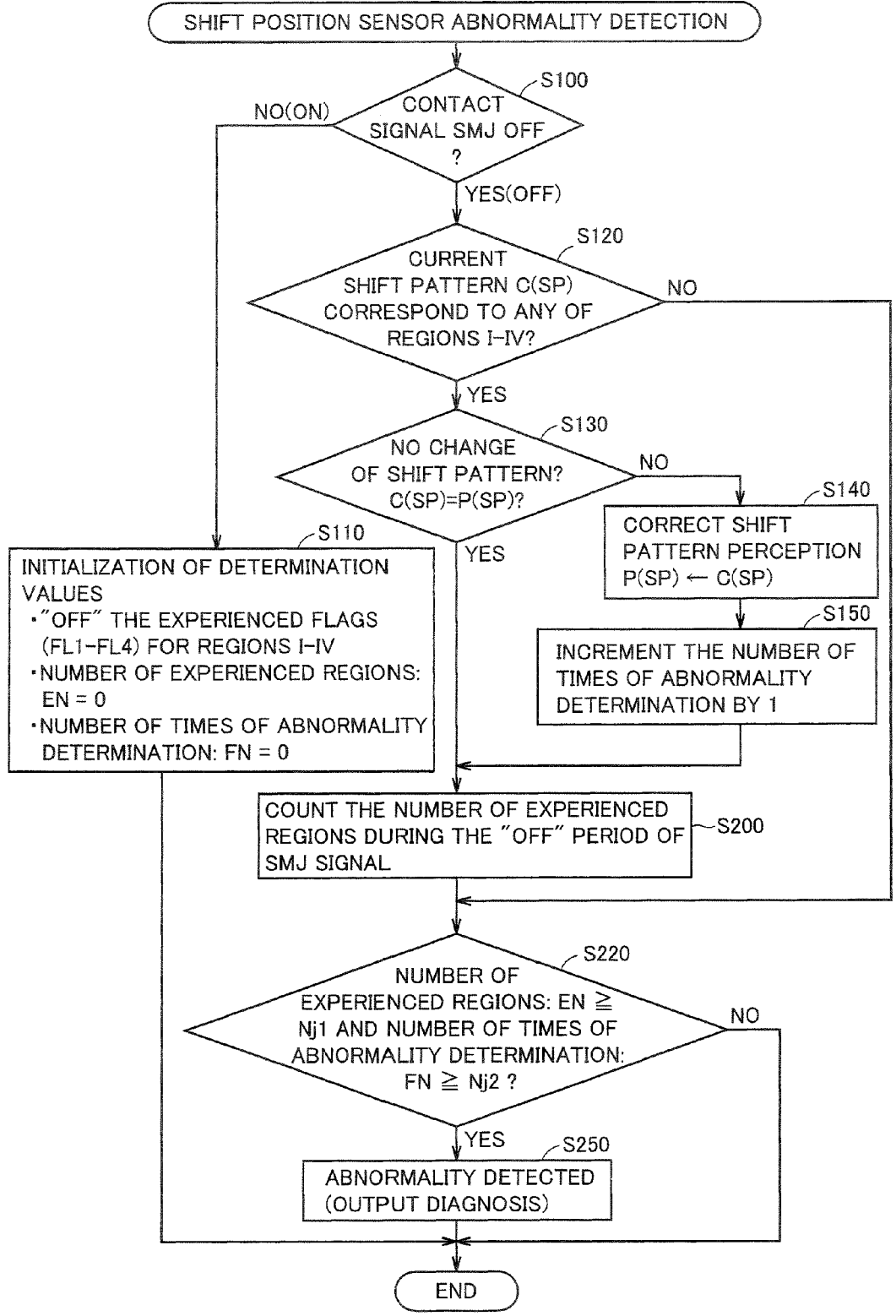
FIG. 4 is a flowchart illustrating a first example of a control routine for shift position sensor abnormality detection by the abnormality detection device of a shift position sensor according to the embodiment of the present invention.

FIG. 4 is a flowchart illustrating a first example of the control routine of the shift position sensor abnormality detection by the abnormality detection device of a shift position sensor according to the embodiment of the present invention.

Referring to FIG. 4, in step S100, ECU 300 determines whether contact signal SMJ from position contact 180 is "OFF".

If contact signal SMJ is "ON" (determination of NO in step S100), the off failure of position contact 180 has not occurred. Thus, in step S110, ECU 300 clears various determination values to initial values. Specifically, experienced flags FL1-FL4 of the respective regions I-IV, which will be described later, are initialized to "OFF", and the value of the number of experienced regions EN and the value of the number of times of abnormality determination FN are also initialized to 0. These determination values are set to the initial values also at the time of system initialization along with the commencement of operation.

If contact signal SMJ is "OFF" (determination of YES in step S100), ECU 300 carries out the following steps for abnormality detection regarding the off failure of position contact 180.

Firstly, in step S120, ECU 300 determines whether the current shift pattern C(SP) belongs to any of predetermined adjacent regions I-IV.

Referring to FIG. 5, adjacent regions I-IV are defined to include, among the transition regions existent between the shift position locations, shift patterns SP2, SP5, SP7, SP9, SP11 and SP14 (hereinafter, also collectively referred to as the "adjacent shift pattern") that are adjacent to the shift patterns corresponding to the shift pattern locations. Specifically, adjacent region I is defined to include shift pattern SP2 that is adjacent to shift pattern SP1, and region II is defined to include shift patterns SP5 and SP7 that are adjacent to shift pattern SP6. Similarly, adjacent region III is defined to include shift patterns SP9 and SP11 that are adjacent to shift pattern SP10, and adjacent region IV is defined to include shift pattern SP14 that is adjacent to shift pattern SP15. Hereinafter, adjacent regions I-IV will also simply be referred to as regions I-IV.

Referring again to FIG. 4, when current shift pattern C(SP) belongs to one of predetermined regions I-IV (determination of YES in step S120), i.e., when it is the adjacent shift pattern, ECU 300 checks presence/absence of a change of the shift pattern in step S130.

In step S130, ECU 300 compares current shift pattern C(SP) with a perceived shift pattern P(SP) that is the shift pattern at the time of previous execution of the abnormality detection control routine. If current shift pattern C(SP) differs from perceived shift pattern P(SP) (determination of NO in step S130), ECU 300 carries out steps S140 and S150 prior to execution of step S200. In the case of determination of YES in step S130, i.e., if there is no change of the shift pattern, ECU 3000 skips steps S140 and S150 and carries out step S200.

In step S140, ECU 300 rewrites the perceived shift pattern P(SP) to the current shift pattern C(SP) and prepares for next execution of the abnormality detection control routine. In step S150, ECU 300 increments the number of times of abnormality determination FN by 1 from the current value. As the number of times of abnormality determination FN is incremented in this manner, the number of times of abnormality determination FN indicates the number of experienced adjacent shift patterns during a single SMJ off period during which contact signal SMJ is maintained at "OFF".

In step S200, ECU 300 counts the number of experienced regions EN that indicates how many of regions I-IV the shift pattern has passed during a single SMJ off period.

Figure 6:
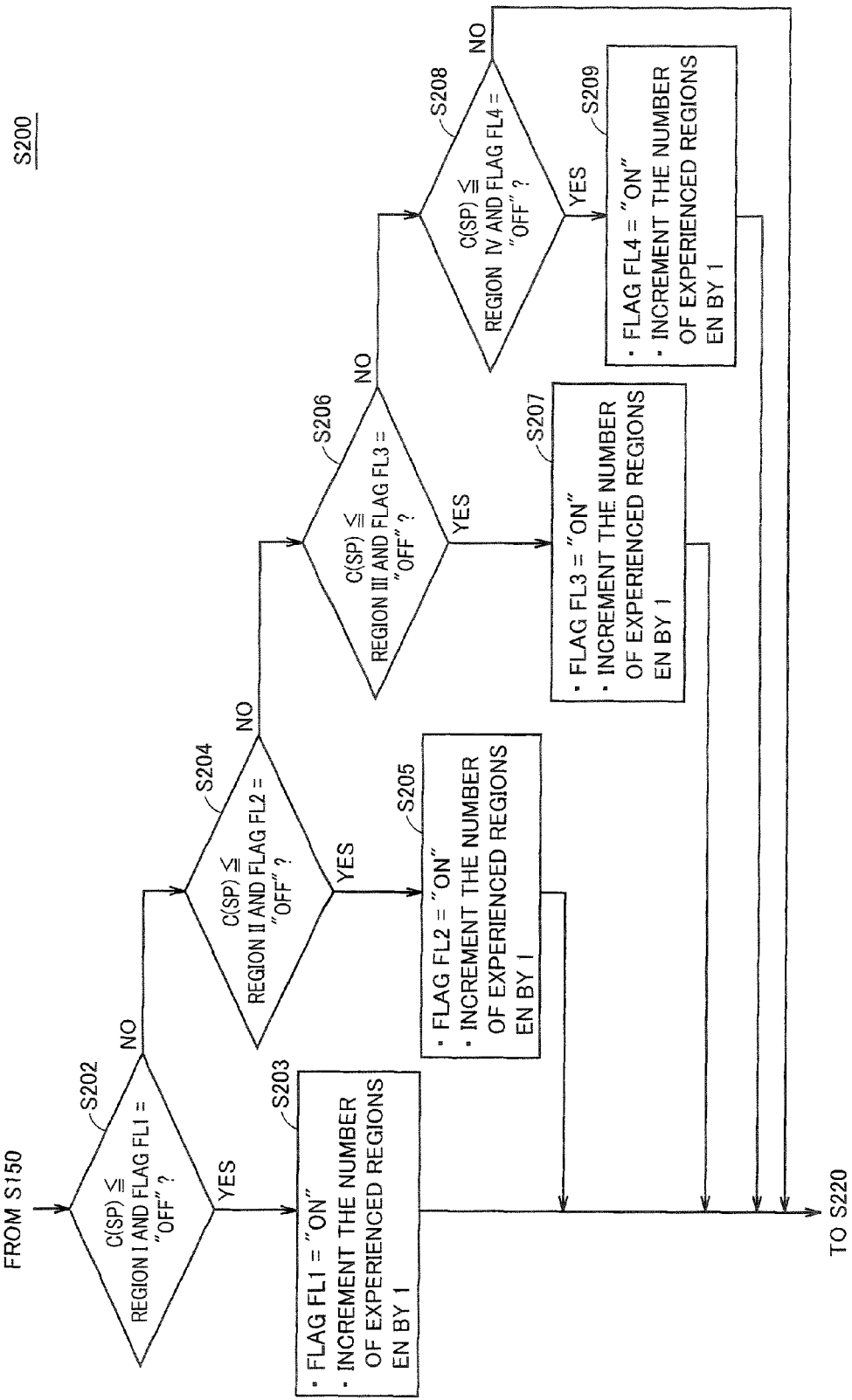
FIG. 6 illustrates in more detail the flowchart shown in FIG. 4.

Referring to FIG. 6, step S200 in FIG. 4 is composed of a group of steps S202-S209.

In step S202, ECU 300 determines whether current shift pattern C(SP) is included in region I and flag FL1 is "OFF". If the determination in step S202 is YES, i.e., upon the first-time experience of region I during the same SMJ off period, ECU 300 changes flag FL1 to "ON" to indicate that region I has been experienced, and increments the number of experienced regions EN by 1 in step S203. Since flag FL1 is thus turned "ON" in step S203, in the case where current shift pattern C(SP) is included in region I again during the same SMJ off period, determination in step S202 becomes NO, so that the number of experienced regions EN is not incremented.

If the determination of step S202 is NO, i.e., in the case of other than the first-time experience of region I during the same SMJ off period, ECU 300 carries out step S204. In step S204, ECU 300 determines whether current shift pattern C(SP) is included in region II and flag FL2 is "OFF". If the determination of step S204 is YES, i.e., upon the first-time experience of region II during the same SMJ off period, ECU 300 changes flag FL2 to "ON" to indicate that region II has been experienced, and increments the number of experienced regions EN by 1 in step S205. As flag FL2 is thus turned "ON" in step S205, in the case where shift pattern C(SP) is included in region II again during the same SMJ off period, determination in step S204 becomes NO, and thus, the number of experienced regions EN is not incremented.

ECU 300 carries out similar steps S206 and S207 for region III, and similar steps S208 and S209 for region IV. As a result, the number of experienced regions EN counted in step S200 indicates how many regions out of regions I-IV the shift pattern has experienced during one SMJ off period.

Referring again to FIG. 4, ECU 300 carries out step S220 following step S200. When the determination of step S120 is NO, i.e., when current shift pattern C(SP) does not belong to any of predetermined regions I-IV, step S220 is carried out while steps S130, S140, S150, and S200 are skipped.

In step S220, ECU 300 determines whether the number of experienced regions EN (S200) and the number of times of abnormality determination FN (step S150) are each equal to or greater than a predetermined determination value. The determination value Nj1 for the number of experienced regions EN is set to enable detection of a change of shift patterns over a shift position location during one SMJ off period.

For example, according to the arrangement of the position contacts shown in FIGS. 2 and 3, when the shift pattern changes from SP2 (region I) to SP7 (region II) during one SMJ off period, the off failure of position contact 180 is confirmed. On the other hand, the off failure of position contact 180 is not confirmed when the shift pattern changes from SP2 (region I) to SP5 (region II).

Thus, in order to avoid an error in abnormality detection, determination value Nj1 is set to 3. That is, in the shift position sensor abnormality detection control according to the present embodiment, the off failure of position contact 180 is detected based on the fact that the contact signals have changed to experience more than one of regions I-IV during the same SMJ off period by passing over shift position location(s), and thus, determination value Nj1 needs to be set to a value that can prevent erroneous detection of abnormality, taking account of arrangement of the position contacts.

The determination value Nj2 for the number of times of abnormality determination FN is set such that abnormality detection is carried out after sliding contact 50 of rotor 100 has moved to some extent, in order to avoid erroneous detection. For example, determination value Nj2 is set to the order of 5 to 10 so that the abnormality detection is carried out after sliding point 50 has moved back and forth one time over movable range 100# (FIG. 2).

If the number of experienced regions EN and the number of times of abnormality determination FN are both equal to or greater than determination values Nj1 and Nj2, respectively (determination of YES in step S220), ECU 300 confirms detection of abnormality for the off failure of position contact 180 in step S250. The detected result is notified to the driver or the like by an output to, e.g., a control panel or a diagnosis monitor not shown.

If at least one of the number of experienced regions EN and the number of times of abnormality determination FN has not reached the corresponding determination value Nj1, Nj2 (determination of NO in step S220), the routine of shift position sensor abnormality detection is terminated, without detection of abnormality. In this case, however, step S110 for clearing the determination values is not carried out, so that the counts of both the number of experienced regions EN (step S200) and the number of times of abnormality determination FN (step S150) are accumulated until contact signal SMJ is turned "ON", i.e., during the same SMJ off period.

Accordingly, in the shift position sensor abnormality detection control according to the present embodiment, abnormality of the off failure of position contact 180 can be detected based on the event that more than one of regions I-IV have been experienced during the same SMJ off period by passing over the shift position location(s). Further, by appropriately setting the number of experienced regions EN and the number of times of abnormality determination FN taking account of the arrangement of the position contacts, erroneous detection of abnormality can be avoided.

In the flowchart shown in FIG. 4, step S120 corresponds to the "adjacent region determination unit" of the present invention, and steps S200, S220 and S250 correspond to the "abnormality detection unit" of the present invention.

Figure 7:
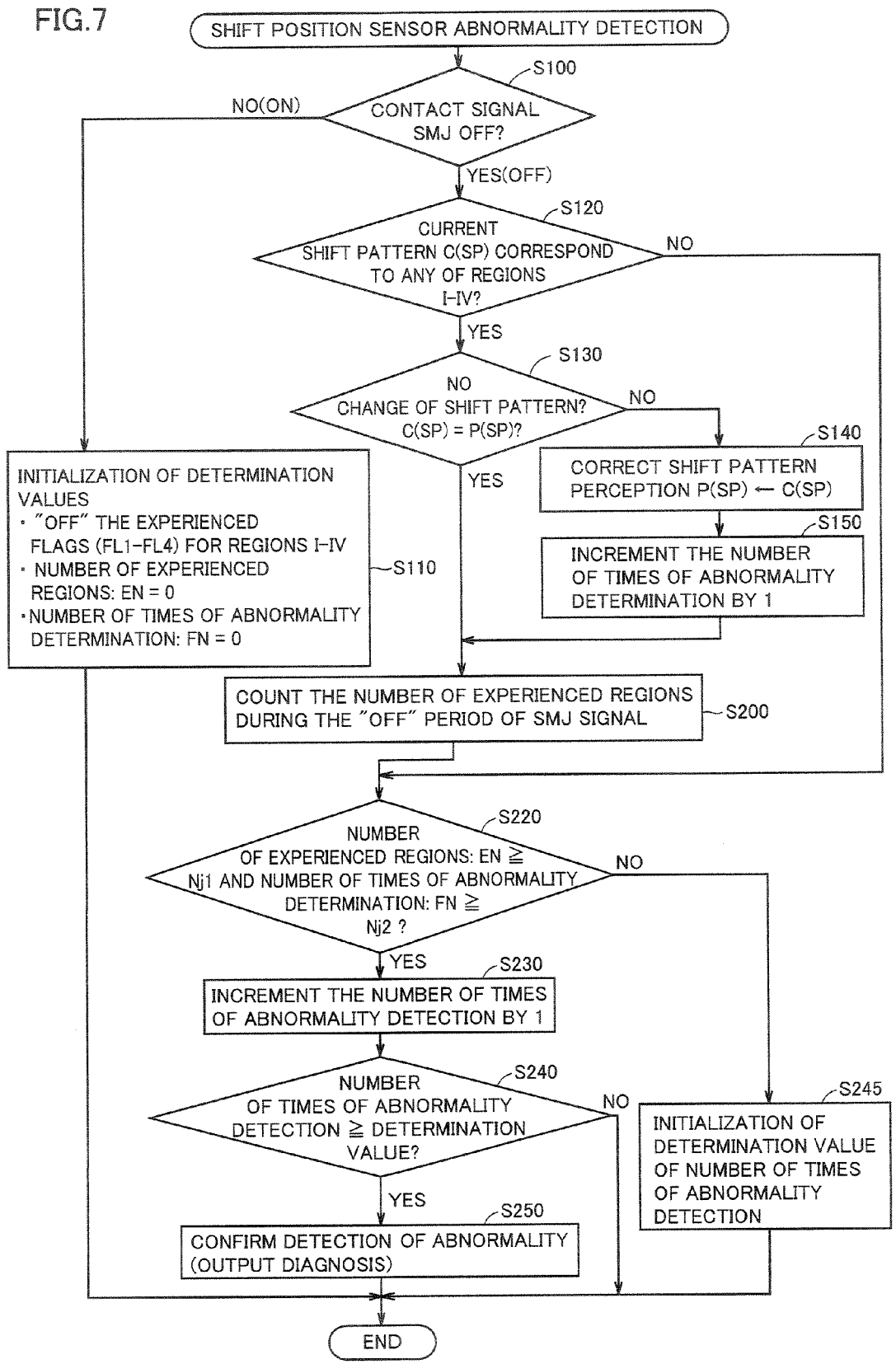
FIG. 7 is a flowchart illustrating a second example of the control routine for shift position sensor abnormality detection according to the embodiment of the present invention.

FIG. 7 is a flowchart illustrating a second example of the control routine of shift position sensor abnormality detection according to the embodiment of the present invention.

In the abnormality detection control routine shown in FIG. 7, ECU 300 further includes steps S230, S240 and S245, compared to the abnormality detection control routine in FIG. 4. Further, the number of times of abnormality detection is added as the determination value, which counts the number of times of abnormality detection by the abnormality detection control routine in FIG. 4. The number of times of abnormality detection is initialized to an initial value (=0) at the time of initialization of the system and at the time of execution of step S110, as in the case of the other determination values shown in FIG. 4. The other portions of the control routine in FIG. 7 are identical to those of the abnormality detection control routine in FIG. 4, and thus, detailed description will not be repeated.

In step S230, ECU 300 increments the number of times of abnormality detection by 1 upon detection of abnormality in the abnormality detection control routine in FIG. 4 (i.e., upon determination of YES in step S220). Further, in step S240, ECU 300 determines whether the number of times of abnormality detection accumulated in step S230 is equal to or greater than a predetermined determination value.

If the number of times of abnormality detection is equal to or greater than a predetermined determination value (determination of YES in step S240), ECU 300 confirms detection of abnormality for the off failure of position contact 180 and notifies the driver or the like of the detected result by an output to, e.g., a control panel or a diagnosis monitor not shown, in step S250 that is identical to that in FIG. 4.

If the number of times of abnormality detection has not reached the predetermined determination value (determination of NO in step S240), the shift position sensor abnormality detection routine is terminated without confirmation of detection of abnormality. When the determination in step S220 is NO, ECU 300 initializes the determination value of the number of times of abnormality detection in step S245. As a result, during the time until contact signal SMJ is turned "ON", i.e., during the same SMJ off period, the abnormality detection processing by the abnormality detection control routine shown in FIG. 4 is carried out repeatedly until the number of times of abnormality detection reaches the predetermined number of times.

With the abnormality detection control routine as described above, erroneous detection of abnormality can be prevented more reliably compared to the case of the abnormality detection control routine in FIG. 4.

Figure 8:
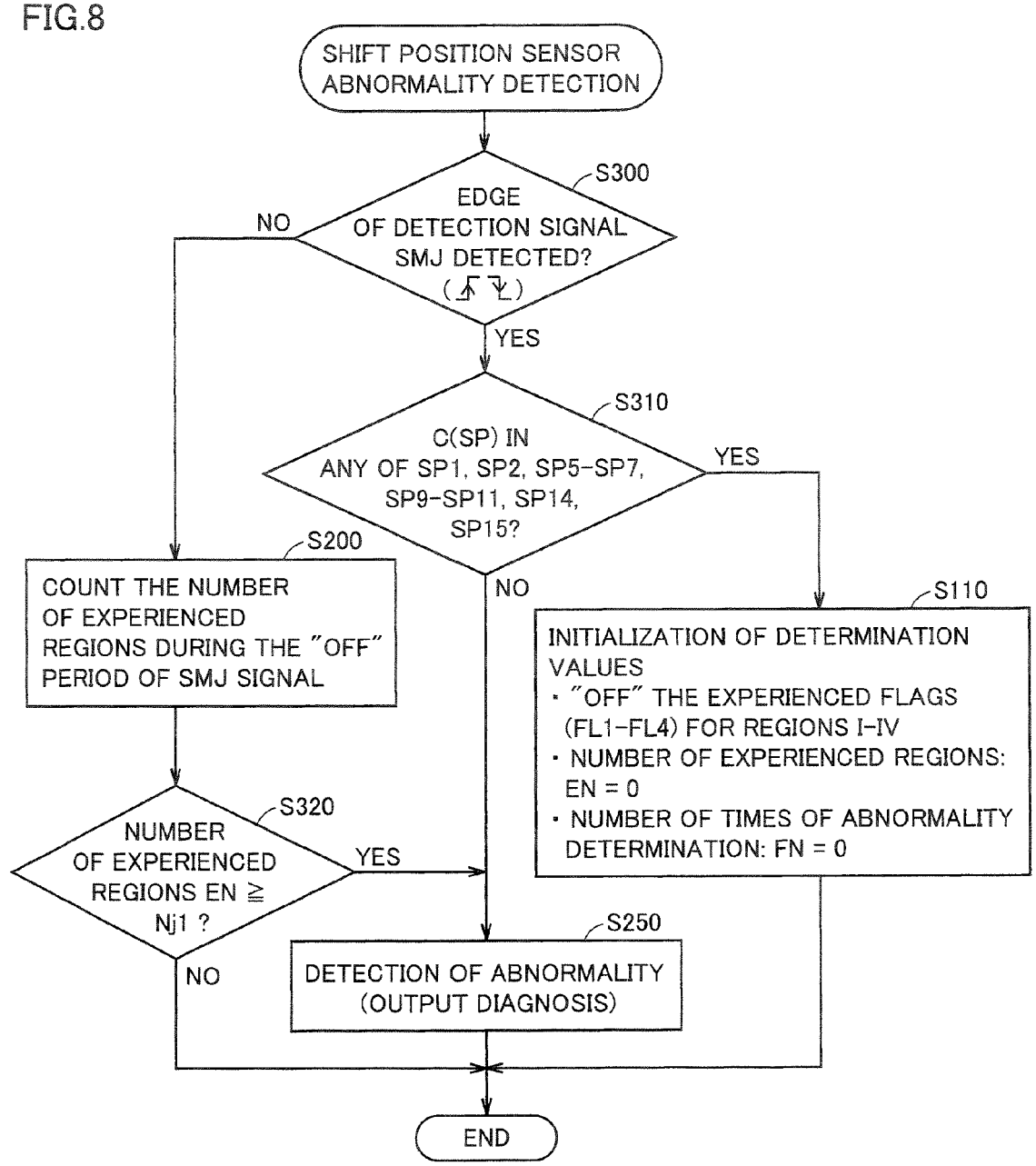
FIG. 8 is a flowchart illustrating a third example of the control routine for shift position sensor abnormality detection according to the embodiment of the present invention.

FIG. 8 is a flowchart illustrating a third example of the control routine of the shift position sensor abnormality detection according to the embodiment of the present invention.

Referring to FIG. 8, in step S300, ECU 300 determines whether an edge of contact signal SMJ, i.e., transition from "OFF" to "ON" or "ON" to "OFF", has been detected.

Upon detection of an edge of contact signal SMJ (determination of YES in step S300), ECU 300 determines in step S310 as to whether the current shift pattern C(SP) belongs to any of shift patterns SP1, SP2, SP5-SP7, SP9-SP11, SP14, and SP15 adjacent to an edge of contact signal SMJ. Here, that the edge of contact signal SMJ is detected means that neither the on failure nor the off failure has occurred for position contact 180 that is the target of abnormality detection in FIG. 4 or FIG. 7.

If shift pattern C(SP) does not belong to any of these shift patterns (determination of NO in step S310), the combination of the contact signals is the one that cannot essentially exist upon detection of an edge of contact signal SMJ. Therefore, in step S250, ECU 300 detects abnormality of position contacts 110-170.

If shift pattern C(SP) belongs to one of those shift patterns (determination of YES in step S310), none of position contacts 110-170 suffers abnormality. Thus, ECU 300 initializes the determination values in step S110 identical to that in FIG. 4, and terminates the abnormality detection routine.

When the determination in step S300 is NO, ECU 300 carries out step S200 identical to that in FIG. 4, wherein it counts the number of experienced regions EN indicating how many of regions I-IV the shift pattern has passed during the period (including one SMJ off period) in which contact signal SMJ does not change.

Further, in step S320, ECU 300 compares the number of experienced regions EN counted in step S200 with determination value Nj1. If the number of experienced regions EN is equal to or greater than determination value Nj1 that is set in a similar manner as in step S220 of FIG. 4 (determination of YES in step S320), ECU 300 detects abnormality of position contact 180 in step S250. The result of detection of abnormality in step S250 is notified to the driver or the like, together with the information specifying the position contact in failure if necessary, by an output to, e.g., a control panel or a diagnosis monitor not shown.

If the number of experienced regions EN has not reached determination value Nj1 (determination of NO in step S320), ECU 300 terminates the abnormality detection routine without detecting abnormality. In this case, however, the count of the number of experienced regions EN is accumulated until an edge of contact signal SMJ is detected, since step S110 for clearing (initializing) the determination value is not carried out. According to the above-described steps S200 and S320, abnormality (off failure) of position contact 180 can be detected as in the case of FIG. 4.

Further, although not shown in the flowchart, the on failure of position contact 180 where contact signal SMJ is fixed to "ON" can be detected by performing comparison processing to determine whether the current shift pattern C(SP) belongs to any of shift patterns SP1, SP6, SP10, SP15-SP17 corresponding to the normal "ON" period of contact signal SMJ upon determination of NO in step S300. That is, in order to detect both the on failure and the off failure of position contact 180, the control may be configured such that determination as to whether contact signal SMJ is "ON" or "OFF" is made upon determination of NO in step S300, and then steps S200 and S320 described above are carried out when contact signal SMJ is "OFF", whereas the comparison processing described above (comparison between C(SP) and shift patterns SP1, SP6, SP10, SP15-SP17) is carried out when contact signal SMJ is "ON".

As described above, in the control routine of the shift position sensor abnormality detection shown in FIG. 8, it is possible to perform abnormality detection for both of position contacts 110-170 and position contact 180. In particular, since the normal contact signal patterns to be compared in step S310 may be limited to some of the shift patterns, detection of failure of each position contact becomes possible with a reduced storage area for the shift patterns to be compared as well as a reduced operation load for the comparison processing. Accordingly, an efficient configuration for abnormality detection can be achieved.

In the case where another abnormality detection configuration is provided for position contact 180, steps S200 and S320 may be deleted from the shift position sensor abnormality detection control routine shown in FIG. 8 to implement the configuration that carries out abnormality detection for only position contacts 110-170.

In the flowchart shown in FIG. 8, step S300 corresponds to the "transition detection unit" of the present invention, step S310 corresponds to the "region determination unit" of the present invention, the processing from step S310 to step S250 corresponds to the "first abnormality detection unit" of the present invention, and the processing from step S200, S320 to S250 corresponds to the "second abnormality detection unit" of the present invention.

In the present embodiment, the abnormality detection device of a shift position sensor having P position, R position, N position, D position and B position as selectable shift positions has been described by way of example. Application of the present invention however is not restricted to such a case. The abnormality detection device of a shift position according to the present invention is applicable to any shift position having three or more selectable shift positions and position contacts provided corresponding to these shift positions in a similar manner.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

INDUSTRIAL APPLICABILITY

The abnormality detection device of a shift position sensor according to the present invention is applicable to a vehicle incorporating an automatic transmission.

The invention claimed is:

1. An abnormality detection device of a shift position sensor having at least three shift positions, a sliding contact movable in accordance with a shift position selecting manipulation of a driver, and a plurality of position contacts outputting prescribed contact signals when coming into contact with the sliding contact,
   said sliding contact having a movable range, the movable range including a plurality of shift position locations corresponding respectively to said shift positions and a transition region positioned between each adjacent two of said shift position locations,
   said plurality of position contacts including a plurality of first position contacts each provided to include corresponding one of said shift position locations and a part of said transition region on each side thereof, and a second position contact provided corresponding to every one of said shift position locations, at least some of said plurality of first position contacts being positioned such that arrangement locations of adjacent two of said first position contacts overlap each other by a predetermined range,
   said shift position sensor being configured to detect that said shift position is selected, when said contact signal is output from said second position contact, based on a combination of said contact signals output from said plurality of first position contacts,
   said abnormality detection device comprising:
   an adjacent region determination unit determining whether the combination of said contact signals from every one of said first and second position contacts belongs to any of a plurality of predetermined adjacent regions set corresponding to respective ones of said plurality of shift position locations among a plurality of regions defined corresponding to the combinations of said contact signals; and
   an abnormality detection unit detecting a failure of said second position contact when said contact signals have changed to experience two or more different ones of said predetermined adjacent regions by passing over said shift position location during a period in which said contact signal from said second position contact is maintained in a non-output state.

2. The abnormality detection device of a shift position sensor according to claim 1, wherein the failure of said second position contact is confirmed when the failure of said second position contact is detected a plurality of times repeatedly by said abnormality detection unit.

3. An abnormality detection device of a shift position sensor having at least three shift positions, a sliding contact movable in accordance with a shift position selecting manipulation of a driver, and a plurality of position contacts outputting prescribed contact signals when coming into contact with the sliding contact,
   said sliding contact having a movable range, the movable range including a plurality of shift position locations corresponding respectively to said shift positions and a transition region positioned between each adjacent two of said shift position locations,
   said plurality of position contacts including a plurality of first position contacts each provided to include corresponding one of said shift position locations and a part of said transition region on each side thereof, and a second position contact provided corresponding to every one of said shift position locations, said plurality of first position contacts being positioned such that arrangement locations of adjacent two of said first position contacts overlap each other by a predetermined range,
   said shift position sensor being configured to detect that said shift position is selected, when said contact signal is output from said second position contact, based on a combination of said contact signals output from said plurality of first position contacts,
   said abnormality detection device comprising:
   a transition detection unit detecting a first transition from an output state to a non-output state and a second transition from said non-output state to said output state of said contact signal from said second position contact;
   a region determination unit determining, upon detection of said first or second transition by said transition detection unit, whether the combination of said contact signals from every one of said first and second position contacts belongs to a predetermined region adjacent to a point of the transition of the contact signal from said second position contact among a plurality of regions defined corresponding to the combinations of said contact signals; and
   a first abnormality detection unit detecting a failure of said first position contact when said region determination unit determines that said combination of said contact signals does not belong to said predetermined region.

4. The abnormality detection device of a shift position sensor according to claim 3, wherein the plurality of regions defined corresponding to the combinations of said contact signals include a plurality of predetermined adjacent regions set corresponding to respective ones of said plurality of shift position locations,
   said abnormality detection device further comprising:
   a second abnormality detection unit detecting a failure of said second position contact when said contact signals have changed to experience two or more different ones of said predetermined adjacent regions by passing over said shift position location during a period in which neither said first transition nor said second transition is detected by said transition detection unit.

* * * * *